United States Patent [19]

Yonezawa

[11] Patent Number: 4,646,279

[45] Date of Patent: Feb. 24, 1987

[54] OPTICAL DISK CUTTING APPARATUS USING MULTIPLE BEAMS

[75] Inventor: Seiji Yonezawa, Hachioji, Japan

[73] Assignee: Hitachi, Ltd., Tokyo, Japan

[21] Appl. No.: 713,891

[22] Filed: Mar. 20, 1985

[30] Foreign Application Priority Data

Mar. 21, 1984 [JP] Japan .................................. 59-52105

[51] Int. Cl.⁴ .............................................. G11B 7/00
[52] U.S. Cl. ...................................... 369/46; 369/44; 369/109; 369/111; 346/108
[58] Field of Search .................... 369/46, 109, 111, 44; 346/108

[56] References Cited

U.S. PATENT DOCUMENTS

| | | | |
|---|---|---|---|
| 3,635,545 | 1/1972 | Vankerkhove et al. | 369/109 |
| 4,449,212 | 5/1984 | Reno | 369/44 |
| 4,449,215 | 5/1984 | Reno | 369/111 |
| 4,459,690 | 7/1984 | Corsover et al. | 369/46 |

Primary Examiner—Aristotelis M. Psistos
Assistant Examiner—Hoa T. Nguyen
Attorney, Agent, or Firm—Antonelli, Terry & Wands

[57] ABSTRACT

Disk cutting apparatus, in which a plurality of beams are generated simultaneously from a laser light source by means of an ultrasonic light deflector, of which beams enter a common focussing lens; the light deflector is so controlled that each spot of the plurality of beams is located on the surface of the disk exactly with a desired track pitch in the radial direction of the disk and when the disk is rotated once a plurality of coaxial tracks are formed simultaneously.

14 Claims, 9 Drawing Figures

OPTICAL DISK CUTTING APPARATUS USING MULTIPLE BEAMS

BACKGROUND OF THE INVENTION

This invention relates to an optical disk device, such as optical video disk, optical audio disk, etc., which is used for an information recording device, such as data file. To be more precise, this invention relates to an optical disk production or cutting apparatus for forming optically pregroove tracks on a disk and to an optical disk recording apparatus for recording optically information on the disk.

When data information is recorded by means of an optical disk recording apparatus for data file optical disk, optical video disk file, etc., the data information should be recorded on a disk with a density so high that the track pitch is e.g. 1.6±0.1 μm and with a high precision.

To this end a recording and playing system, by which data information is recorded on a pregrooved disk, has been already proposed (Japanese Patent Application Laid-open No. 49-113601). FIG. 1 shows principal parts of a prior art apparatus for fabricating pregrooved disks.

Pregrooved information is made on a disk by modulating a laser beam emitted by a laser device 1, e.g. argon laser, helium-cadmium laser, by means of an optical modulator 2 and by forming a small light spot 5 on the surface of the rotating disk 6 by means of an objective lens 4. On the disk 6 is applied a layer of photosensitive material 7, e.g. photoresist, and the disk is rotated by a motor 8.

The laser-beam is so intensity-modulated by the optical modulator 2 that the sector part is optically ¼ wavelength deep and the data part is optically ⅛ wavelength deep is a pregrooved track. The pregroove is formed to be spiral. In order to form a spiral pregroove track on the whole surface of the disk 6, an optical system 3 is advanced continuously with a uniform velocity in a radial direction of the disk by a screw. For forming the pregroove track with a track pitch precision of 1.6±0.1 μm on the disk, ultrahigh precision tools, such as an ultrahigh precision lap screw 10, a pneumatic bearing sliding shaft 11, a precision rotary motor 12, an ultrahigh lap gear 13, etc. are used in the mechanism part 9 for advancing the optical system 3. However, it is impossible to keep track pitch errors under 0.1 μm.

FIG. 2A shows an example of positional relations between pregroove tracks 15-1, 15-2 and a recording light spot 17 in the case where data information is recorded on the pregroove track produced by means of the prior art apparatus shown in FIG. 1.

The pregroove tracks 15-1, 15-2 are optically ⅛ wavelength deep and diffracted light of the spot 17 from the center of the track 15-1 can be detected by measuring light reflected by the track by means of a differential light detector (Japanese Patent Application Laid-open No. 54-154304). However, this tracking system is very sensitive to the form of the pregroove and skew of the disk, and it is difficult to record data information with a high reliability on the pregroove tracks 15-1, 15-2, ...

FIG. 2B shows another example of positional relations between the pregroove tracks 15-1, 15-2 and light spots 17, 18, 19. In the figure the pitch of the pregroove tracks 15-1, 15-2 is 1.6±0.1 μm. The light spot 17 represents the main beam for recording data information and the light spots 18, 19 indicate side beams for tracking. These twin spots 18, 19 are arranged to be on the edges of one pregroove track 15-1 and tracking signals are derived by detecting reflected light from each of the light spots (Japanese Patent Application Publication No. 53-13123).

In the arrangement shown in FIG. 2B, when data 20 information is recorded on the pregroove track 15-1 by using the main beam 17, the side spot 19 for the tracking is not influenced by the data pit 20, but the side spot 18 is influenced by the data pit 20, which gives rise to unbalance in output signals coming from the light spots 18 and 19. As the results tracking can be effected no more precisely.

SUMMARY OF THE INVENTION

This invention has been made to remove these deficiencies and the object of this invention is to provide a disk production or cutting apparatus permitting to form pregroove tracks on a whole surface of a disk with a high precision in a short time without being influenced by the mechanical precision and a disk recording apparatus for recording precisely data information, reducing tracking errors.

In order to achieve this object, according to this invention, for fabricating a disk multi-beams are generated simultaneously from a laser light source by means of an ultrasonic light deflector, of which beams enter a common focussing lens. The light deflector is so controlled that each spot of the plurality of beams is located on the surface of the disk exactly with a desired track pitch in the radial direction of the disk and when the disk is rotated once, a plurality of coaxial tracks are formed simultaneously. In the case where data information is recorded on the above disk, the main beam is located on a middle land between two adjacent tracks and the side spots of the subsidiary beams are placed on the two tracks so that the tracking signal is not influenced by data pits and tracking is effected with a high reliability.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF THE PREFERRED EMBODIMENTS

Figure 1:
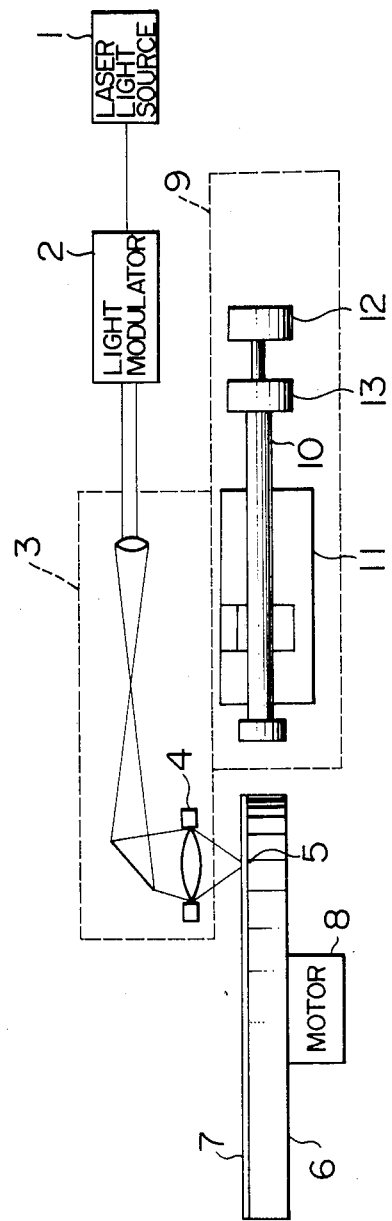
FIG. 1 indicates the construction of a prior art disk production or cutting apparatus for producing a pregroove.
Figure 2A:
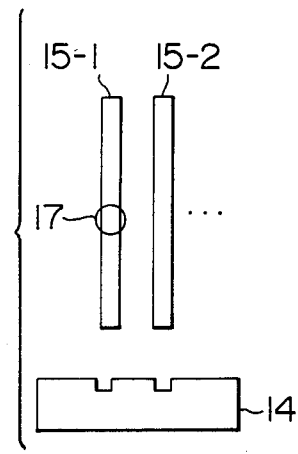
FIGS. 2A and 2B illustrate the prior art positional relation between the pregroove and the light spots.
Figure 2B:
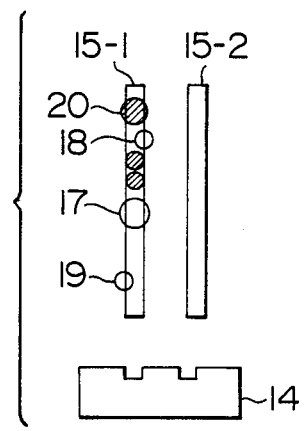

Hereinbelow some preferred embodiments according to this invention will be explained, referring to the drawings.

Figure 3:
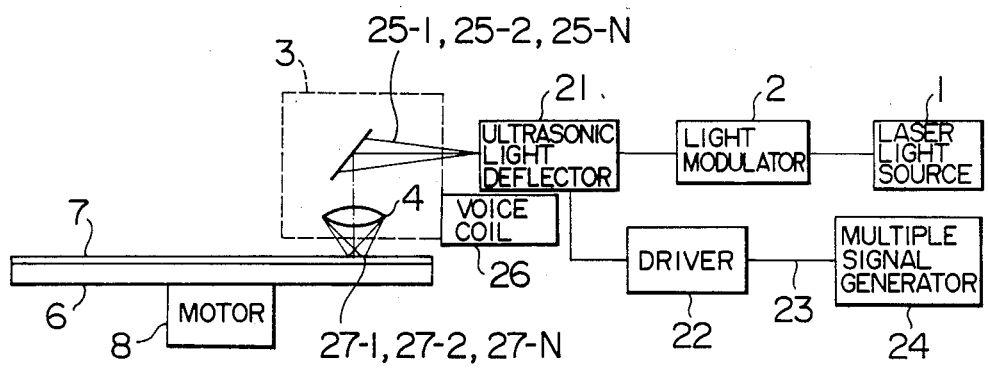
FIG. 3 indicates the construction of an example of disk production apparatuses for producing pregrooves according to this invention.

FIG. 3 indicates the construction of a disk production or cutting apparatus for producing pregrooves according to this invention.

In the figure a laser beam produced by a laser light source 1, e.g. an argon laser, enters a light deflector 21 through a light modulator 2. As the light deflector 21 e.g. an ultrasonic light deflecting element using a $TeO_2$ crystal can be used. A signal generator 24 produces a plurality of sinusoidal signals (e.g. N=40), which are controlled in frequency by phase-locked loops and further so controlled that the frequency interval is exactly constant. A driving signal is synthesized by adding the sinusoidal signals and drives an ultrasonic light deflector 21 through a driver 22 so that a plurality of beams 25-1, 25-2, ..., 25-N, which are deviated differently from each other by the same angle proportional to the frequency interval of the inputted signal, are generated. This plurality of beams 25-1, 25-2, ..., 25-N pass through a common objective lens 4 and form a plurality of spots 27-1, 27-2, ..., 27-N on the surface of the disk 6.

Figure 4:
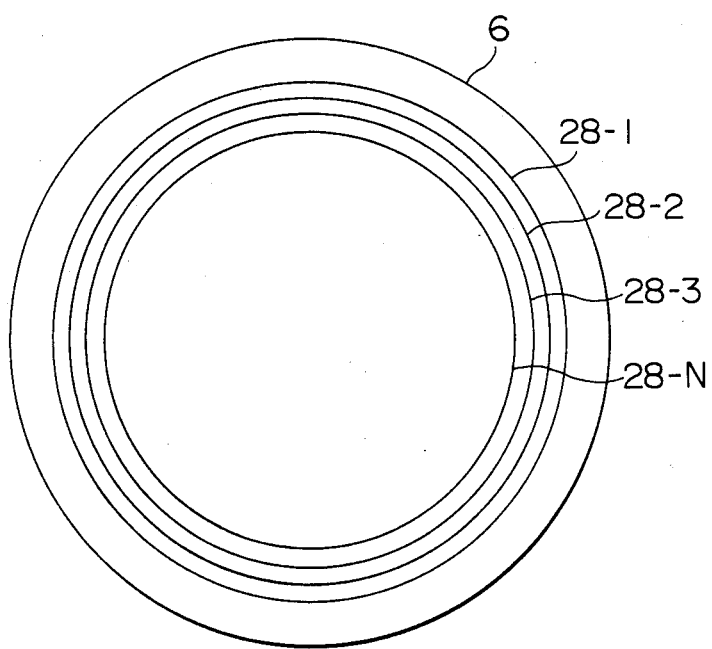
FIG. 4 is a plan view of pregroove tracks on a disk, which is an example of those produced by means of an apparatus according to this invention.
Figure 5:
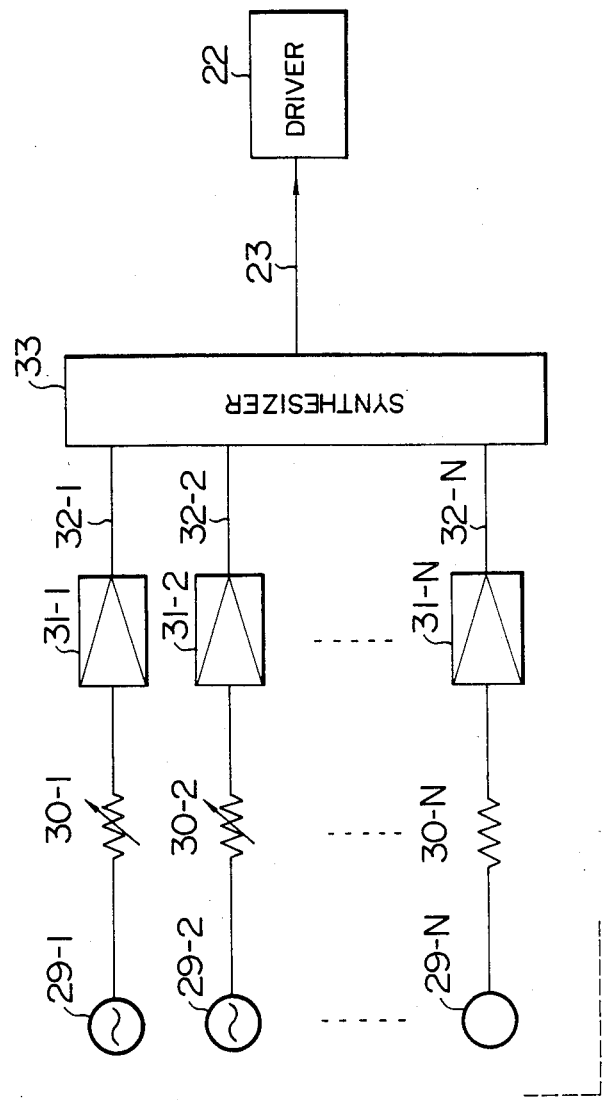
FIGS. 5 and 6 show the construction of a multisignal generating circuit used in an apparatus according to this invention.

Next the system for recording N tracks 28-1, 28-2, ..., 28-N with a constant pitch of 1.6 μm and with such a precision that track pitch errors are smaller than 0.1 μm, as indicated in FIG. 4, according to this invention, will be explained, referring to an example.

Now, in order to shift the light spots 27-1, 27-2, ..., 27-N by 1.6 μm on the surface of the disk supposing the focal length of the objective lens 4 f=4 mm, since the following relationship is valid:

$$4 \text{ mm} \times \Delta\theta = 1.6 \text{ μm} \quad (1)$$
$$\therefore \Delta\theta = 0.4 \times 10^{-3} \text{ radian},$$

a deviation of the light beam by $0.4 \times 10^{-3}$ radian is sufficient thereto. Denoting the wavelength of laser by $\lambda_o$, the velocity of the ultrasound in the crystal 21 by $V_s$, and the variation of the frequency of the ultrasound by $\Delta f_s$, the deflection angle of the light beam $\Delta\theta$ can be given by the following equation.

$$\left.\begin{array}{l} \Delta f_s = \Delta\theta \cdot V_s/\lambda \\ \text{Using a } TeO_2 \text{ element as the crystal} \\ \text{21 and substituting} \\ \Delta\theta = 0.4 \times 10^{-3} \text{ radian} \\ \lambda_o = 0.5 \times 10^{-6} \text{ m} \\ V_s = 650 \text{ m/s} \end{array}\right\} \quad (2)$$

The following value is obtained.

$$\Delta f_s = 0.5 \text{ MHz}$$

That is, a frequency variation of 0.5 MHz is necessary for deviating the light spot 27-1, 27-2, ..., 27-N on the surface of the disk by a distance corresponding to the track pitch of 1.6 μm.

Consequently, in order to form N light spots 27-1, 27-2, ..., 27-N with an interval of 1.6 μm, the oscillator 24 should generate N standard signals whose frequencies are different from each other by $$\Delta f_s = 0.5 \text{ MHz} \quad (3)$$

For example, if N=40, $$\Delta f_s \times N = 0.5 \times 40 \quad (4)$$
$$= 20 \text{ MHz}$$

That is, the frequency band width of the deflector 21 should be 20 MHz. Using a $TeO_2$ crystal as the ultrasonic deflector 21, the central frequency $$f_o = 90 \text{ MHz}. \quad (5)$$

Consequently a frequency band width of 50 MHz is possible. Therefore, in order to achieve the deflection described above, N standard signals represented by $$\left.\begin{array}{l} f_n = f_o + n \Delta f_s \\ f_o = 90 \text{ MHz} \\ \Delta f = 0.5 \text{ MHz} \\ n = 1, 2, \ldots, 40 \end{array}\right\} \quad (6)$$

may be generated in the oscillator 24 and after having been synthesized, inputted in the ultrasonic deflector 21.

In FIG. 5, 29-1, 29-2, ..., 29-N are reference standard signal generators generating N signals, which are so controlled in frequency by phase-locked loops that their frequency interval is a predetermined value. The signals pass through attenuators 30-1, 30-2, ..., 30-N and amplifiers 31-1, 31-2, ..., 31-N, and the output signals 32-1, 32-2, ..., 32-N of the amplifiers are added in waveform in a synthesizer 33. The signal 33 thus synthesized is inputted in the driver 22, which drives the ultrasonic deflector 21.

Figure 6:
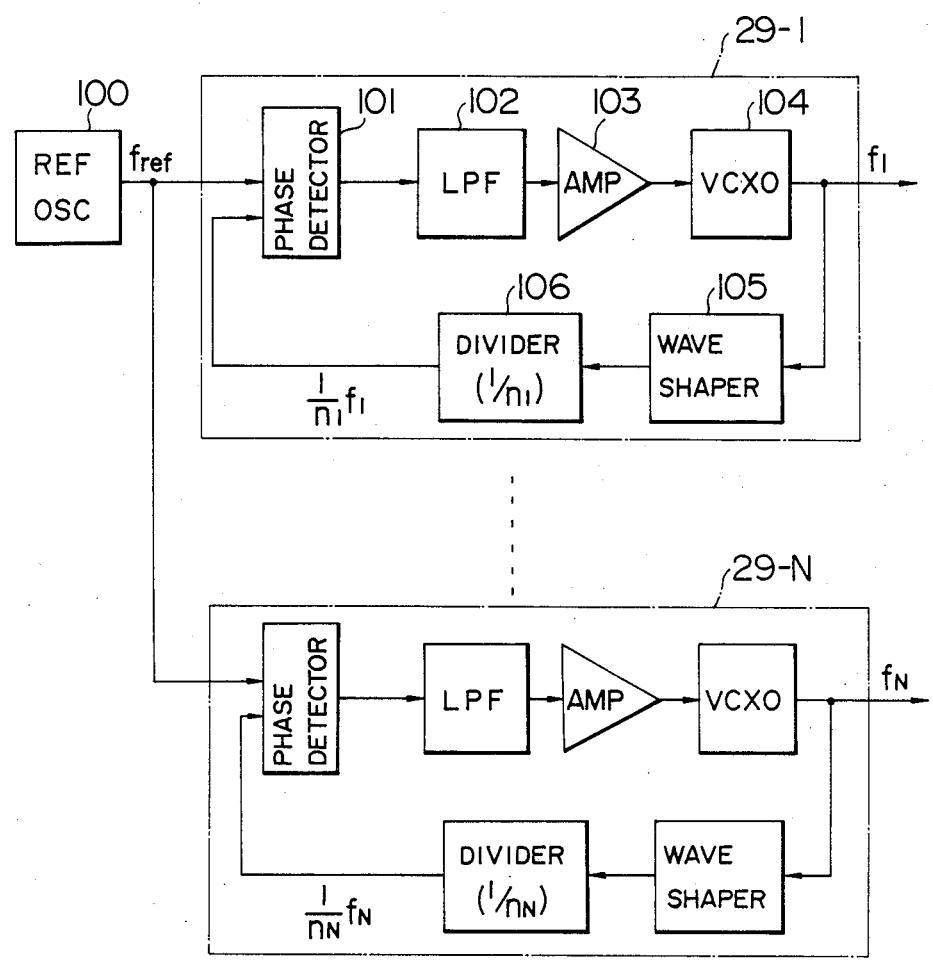

Here, the concrete circuit construction of the reference signal generators 29-1, 29-2, ..., 29-N will be explained, referring to FIG. 6. A high-stabilized reference oscillator (REF OSC) 100 producing a signal having a predetermined reference frequency $f_{ref}$ is used in common for the reference signal generators 29-1, 29-2, ..., 29-N. The signal of each of the reference signal generators is so controlled that its phase is equal to that of the reference signal coming from the high-stabilized reference oscillator 100. As the reference oscillator, e.g. a temperature compensated quartz oscillator is used. This quartz oscillator has a frequency stability of about $10^{-10}$. Since the N reference signal generators have the same construction, only the reference signal generator 29-1 will be explained here. The reference signal generator 29-1 consists of a phase detector (PD) 101, a low pass filter (LPF) 102, an error amplifier (AMP) 103, a voltage controlled crystal oscillator (VCXO) 104, a wave shaper 105 and a divider ($1/n_1$) 106. A phase-locked loop is so constructed that the frequency of the output signal of the divider 106 ($1/n_1 f_1$) is equal to the frequency of the reference oscillator 100 ($f_{ref}$). That is, the output of the VCXO 104 is pulse-shaped in the wave shaper 105 and frequency-divided to $1/n_1$ in the divider 106. The phase difference between the output of the divider 106 and that of the reference oscillator 100 is detected by the phase detector 101 and a control voltage is produced corresponding to this phase difference. This control voltage is deprived of high frequency components by the LPF 102, amplified by the error amplifier 103, and inputted in the VCXO 104 as the signal controlling the oscillation frequency. The VCXO 104 is an oscillator producing a signal, whose frequency is approximately equal to the desired frequency $f_1$, when the signal controlling the oscillation frequency is zero, and slightly varies, depending on the magnitude of the signal controlling the oscillation frequency. As a result, a signal having a frequency $f_1 = n_1 f_{ref}$, which is so phase controlled that its phase is the same as that of the output of the reference oscillator 100, is obtained at the output of the VCXO 104. This signal is inputted through the attenuator 30-1 and the amplifier 31-1 into the synthesizer 33.

The number of tracks 28-1, ..., 28-N, which can be recorded in parallel by one rotation of the disk, is determined by the band of the ultrasonic light deflector 21, the diffraction efficiency, the output power of the laser light source 1, the visual field of the lens 4 and the sensitivity of the recording material 7. For a $TeO_2$ light deflector, supposing that the band is wider than 50 MHz, that the diffraction efficiency is 30%, and that the sensitivity of the recording material is 20 mW/1 channel beam, the band width of the light deflector, which is necessary for 40 channels, is;

$$0.5 \times 40 = 20 \text{ MHz}, \qquad (7)$$

and the necessary output of the laser light source 1 is;

$$40 \text{ channels} \times 20 \text{ mW/channel} \times 1/0.3 = 2.6 \text{ Watt} \qquad (8)$$

Consequently it is possible to record 40 tracks in parallel by one rotation by using an argon laser having a laser output of 3 W ($\lambda = 0.51$ $\mu$m).

For example, for a rotation speed of the disk of 1800 rpm, 40 tracks can be recorded in 33 msec. Supposing that the diameter of the disk is 30 cm and that the track pitch is 1.6 $\mu$m, 40,000 tracks should be recorded, and according to this invention, by $$40,000/40 = 1,000 \text{ blocks}$$

that is, by 1,000 repetitions 40,000 tracks can be recorded.

The period of time necessary therefor is, supposing a period of time of 20 ms for advancing the head, $$T = (33 + 20) \times 10^{-3} \times 1000 = 53 \text{ sec} \qquad (8)$$

That is, the recording of one disk can be carried out within one minute.

In addition, according to an embodiment of this invention, it is possible to ameliorate the track pitch precision for the tracks 28-1, 28-2, ..., 28-N by more than one order of magnitude with respect to the system using a mechanical screw as shown in FIG. 1.

That is, using Equations (1), (2) and (6), variations of the deflection angle $\Delta\theta$ can be represented by $$\left.\begin{array}{c} \dfrac{\delta(\Delta\theta)}{\Delta\theta} = 1 + \dfrac{\delta(\Delta f_s)}{\Delta f_s} + \dfrac{\delta(\lambda)}{\lambda} - \dfrac{\delta(V_s)}{V_s}, \\[6pt] \text{and the following values are obtained} \\[6pt] \dfrac{\delta(\Delta f_s)}{f_s} < 10^{-5} \\[6pt] \dfrac{\delta(\lambda)}{\lambda} < 10^{-5} \\[6pt] \dfrac{\delta(V_s)}{V_s} < 10^{-5}. \end{array}\right\} \qquad (9)$$

Therefore, it is possible to obtain track pitch errors smaller than 0.1%.

In addition, here, when the formation of pregroove tracks of one block is ended, it is necessary to move mechanically the optical system 3 or the disk 6 in the radial direction for the formation of pregroove tracks of the succeeding block. In FIG. 3, reference numeral 26 designates a voice coil used for moving the optical system 3.

Figure 7:
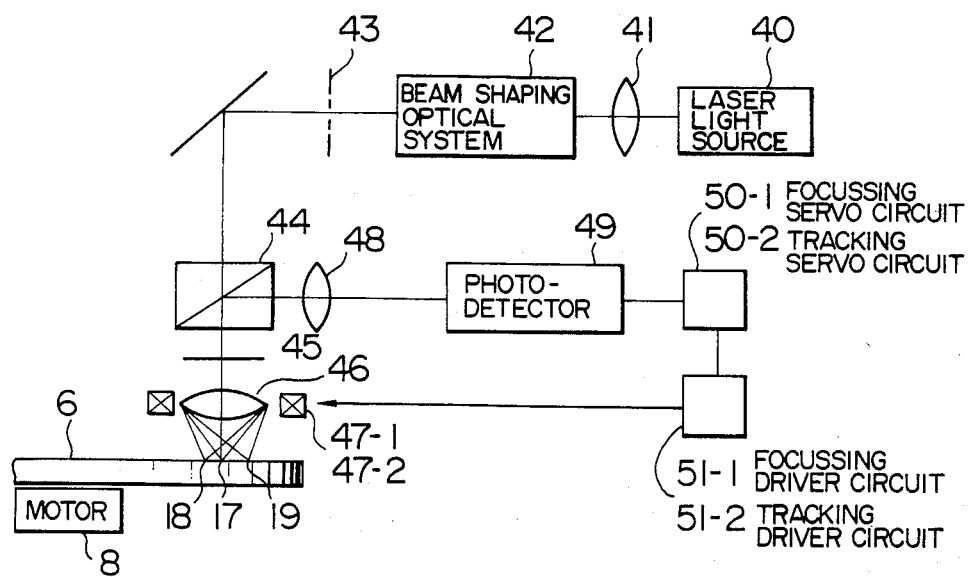
FIG. 7 shows the construction of an example of disk recording apparatuses according to this invention.

FIG. 7 is a scheme showing the construction of a disk recording apparatus according to this invention. In FIG. 7, a semiconductor laser, which camn be directly modulated serves as the laser light source 40. The modulated light beam is transformed into a symmetrical circular beam by a coupling lens 41 and a beam shaping optical system 42 and forms 3 light spots 17, 18, 19 on the surface of the disk 6 through a diffraction grating 43, a beam splitter 44, a ¼ wavelength plate 45 and an objective lens 46.

The objective lens 46 is mounted on actuators 47-1, 47-2 moving two-dimensionally for focussing to form small light spots on the surface of the disk and for locating the main light spot on the middle land between two adjacent tracks 28-1, 28-2, ..., 28-N.

Reflected light from the light spots 17, 18, 19 on the disk is received through the beam splitter 44 and a lens 48 by a photodetector 49. Control error signals from the photodetector 49 drive the two-dimensional actuators 47-1, 47-2 through a focussing servo circuit 50-1, a tracking servo circuit 50-2, a focussing driver 51-1 and a tracking driver circuit 51-2.

Figure 8:
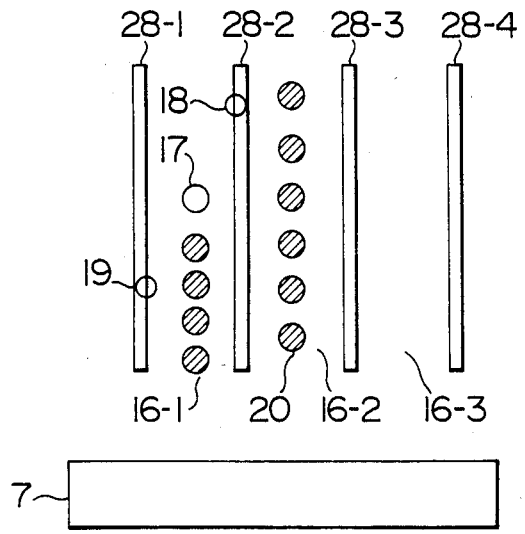
FIG. 8 illustrates the positional relation between the pregroove tracks and the light spots on a disk produced in an apparatus according to this invention.

FIG. 8 illustrates the positional relation between the pregroove tracks and the light spots.

The main beam 17 for data record and play is located at the land part 16-1 between two adjacent tracks 28-1 and 28-2 and the side spots 18, 19 are placed at the edge part of the tracks 28-1, 28-2. The tracking error signal is obtained from the difference of the reflected light intensities coming from the light spots 19, 18 irradiating the edge parts of the tracks 28-1, 28-2. Since the interval between the tracks 28-1 and 28-2 can be formed with a track pitch precision of $1.6 \pm 0.02$ $\mu$m, as explained referring to FIGS. 3, 4 and 5, the light spot arrangement as indicated in FIG. 8 doesn't give rise to tracking off set.

In addition, owing to the fact that the main beam 17 records data information at the land part 16-1 between the track 28-1 and the track 28-2, the side spots 18, 19 are not influenced by the data pit 20, and thus stable tracking can be obtained.

As explained above, according to this invention, it is possible to effect very rapidly servo-writing (cutting) on one disk by forming a plurality of coaxial tracks, for which track pitch errors are very small, by means of a light deflector.

Furthermore, in the data recording precise tracking can be obtained without influence of data pits on the tracking signal by locating the main beam among the three light beams on the middle land between two adjacent tracks and by arranging the side spots on the tracks of both the sides of the middle land.

What is claimed is:

1. Disk cutting apparatus comprising a light source, an ultrasonic light deflector deviating a light beam emitted by said light source in a plurality of angular directions, driving means for driving said ultrasonic light deflector, and an optical system focussing a plurality of light beams deviated in said plurality of angular directions by said ultrasonic light deflector onto a disk, wherein said driving means includes one reference oscillator generating a reference signal having a predetermined reference frequency, a plurality of signal generating circuits for generating, respectively, a plurality of signals frequency-controlled by phase-locked loops based on said reference signal with the same frequency, a synthesizer for synthesizing outputs from said plurality of signal generating circuits, and a driver coupled to said ultrasonic light deflector to which an output from said synthesizer is applied, thereby simultaneously forming a plurality of coaxial tracks with a constant interval therebetween on said disk.

2. Disk cutting apparatus according to claim 1, wherein each of said plurality of signal generating circuits comprises a voltage controlled oscillator, a divider for dividing an output from said voltage controlled oscillator, and a phase detector for outputting a control voltage corresponding to a phase difference between an output from said divider and said reference frequency of said reference signal thereby controlling an oscillation frequency of said voltage controlled oscillator.

3. Disk cutting apparatus according to claim 1, wherein a light modulator for modulating said light beam emitted by said light source is provided in an optical path between said light source and said ultrasonic light deflector.

4. Disk cutting apparatus according to claim 2, wherein a light modulator for modulating said light beam emitted by said light source is provided in an optical path between said light source and said ultrasonic light deflector.

5. Laser disk cutting apparatus comprising a disk coated with photoresist, a laser light source, an ultrasonic light deflector dividing to deviate a laser beam emitted by said laser light source in a plurality of angular directions, driving means for driving said ultrasonic light deflector, and an optical system focussing a plurality of laser beams deviated in said plurality of angular directions by said ultrasonic light deflector onto said photoresist on said disk, wherein said driving means includes one reference oscillator generating a reference signal having a predetermined reference frequency, a plurality of signal generating circuits for generating, respectively, a plurality of signals having different frequencies at a constant interval, which are frequency-controlled by phase-looked loops based on said reference signal with the same frequency, a synthesizer for synthesizing outputs from said plurality of signal generating circuits, and a driver coupled to said ultrasonic light deflector to which an output from said synthesizer is applied, thereby simultaneously forming a plurality of pregrooved tracks with a constant interval therebetween on said disk.

6. Laser disk cutting apparatus according to claim 5, wherein said reference oscillator comprises a crystal oscillator which is temperature-compensated.

7. Laser disk cutting apparatus according to claim 5, wherein each of said plurality of signal generating circuits comprises a voltage controlled oscillator, a divider for dividing an output from said voltage controlled oscillator, and a phase detector for outputting a control voltage corresponding to a phase difference between an output from said divider and said reference frequency of said reference signal, thereby controlling an oscillation frequency of said voltage controlled oscillator.

8. Laser disk cutting apparatus according to claim 7, wherein each of said plurality of signal generating circuits further comprises a low pass filter between said phase detector and said voltage controlled oscillator for depriving the output from said phase detector of high frequency components.

9. Laser disk cutting apparatus according to claim 8, wherein each of said plurality of signal generating circuits further comprises a wave shaper between said voltage controlled oscillator and said divider for pulse-shaping the output from said voltage controlled oscillator.

10. Laser disk cutting apparatus according to claim 6, wherein each of said plurality of signal generating circuits comprises a voltage controlled oscillator, a divider for dividing an output from said voltage controlled oscillator, and a phase detector for outputting a control voltage corresponding to a phase difference between an output from said divider and said reference frequency of said reference signal, thereby controlling an oscillation frequency of said voltage controlled oscillator.

11. Laser disk cutting apparatus according to claim 10, wherein each of said plurality of signal generating circuits further comprises a low pass filter between said phase detector and said voltage controlled oscillator for depriving the output from said phase detector of high frequency components.

12. Laser disk cutting apparatus according to claim 11, wherein each of said plurality of signal generating circuits further comprises a wave shaper between said voltage controlled oscillator and said divider for pulse-shaping the output from said voltage controlled oscillator.

13. Laser disk cutting apparatus according to claim 5, wherein a light modulator for modulating said laser beam emitted by said laser light source is provided in an optical path between said laser light source and said ultrasonic light deflector.

14. Laser disk cutting apparatus according to claim 6, wherein a light modulator for modulating said laser beam emitted by said laser light source is provided in an optical path between said laser light source and said ultrasonic light deflector.

* * * * *